April 1, 1947.    T. S. BRISKIN ET AL    2,418,331
MAGAZINE HOLDER FOR MOTION PICTURE CAMERAS
Filed Feb. 15, 1945    2 Sheets-Sheet 1
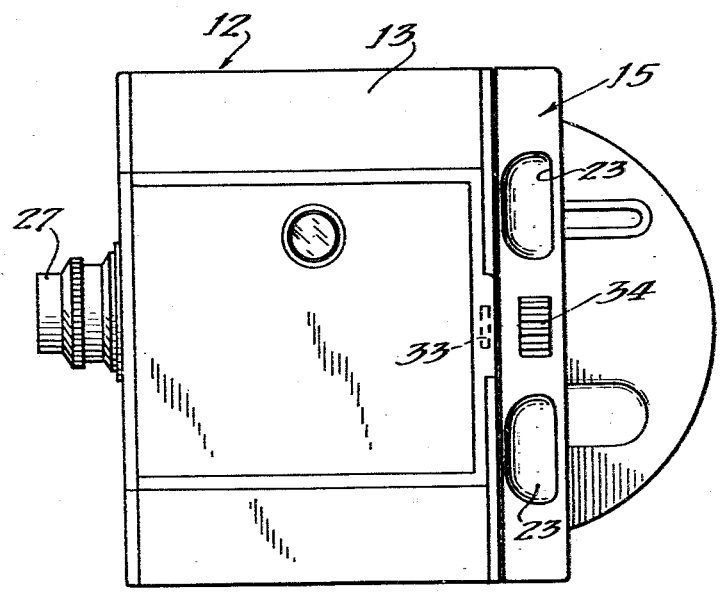
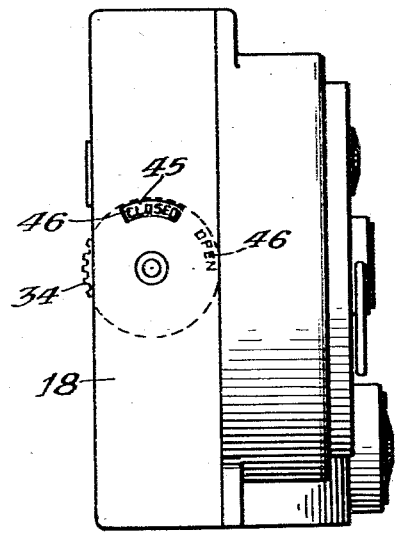
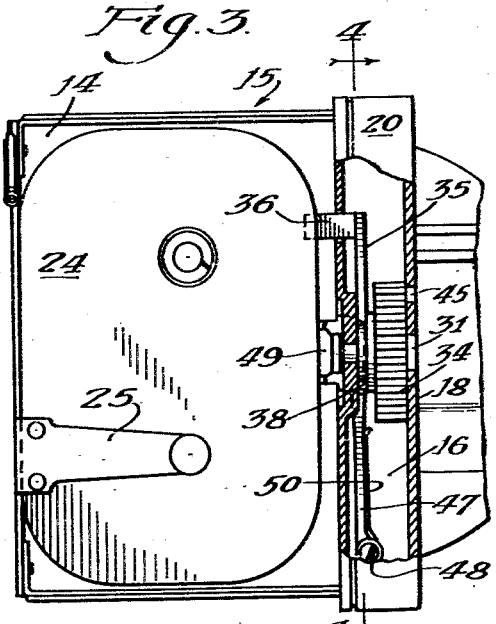
Inventors:
Theodore S. Briskin
Joseph Golick
By: Zabel, Carlson, Fitzhugh & Wells
Attorneys

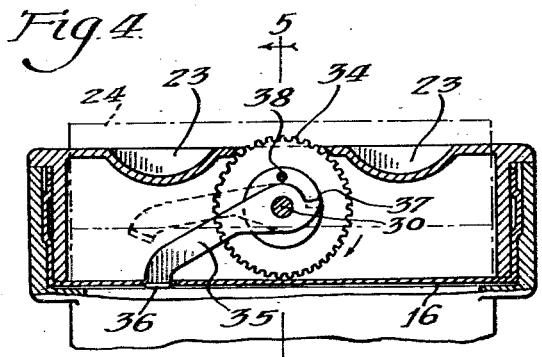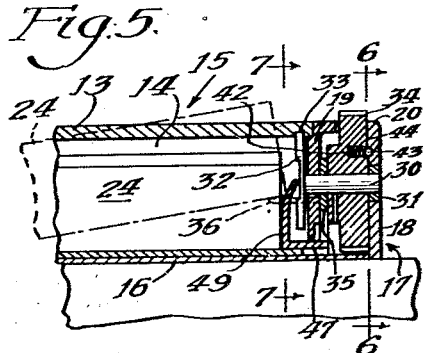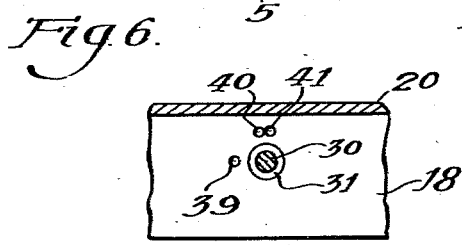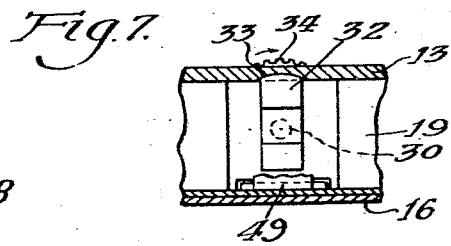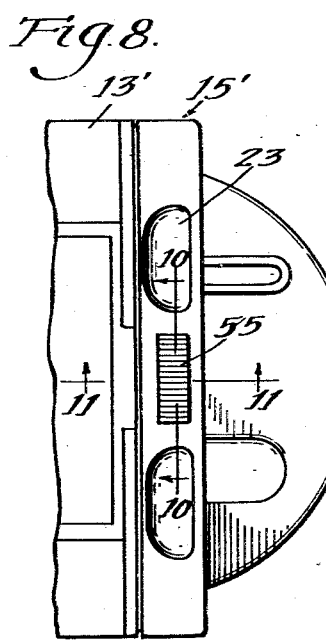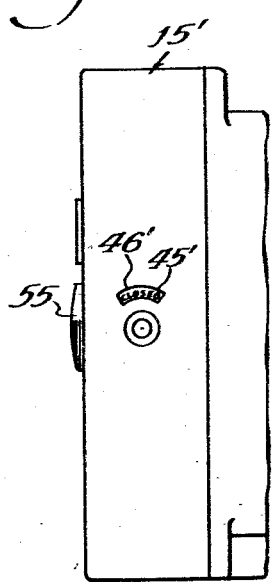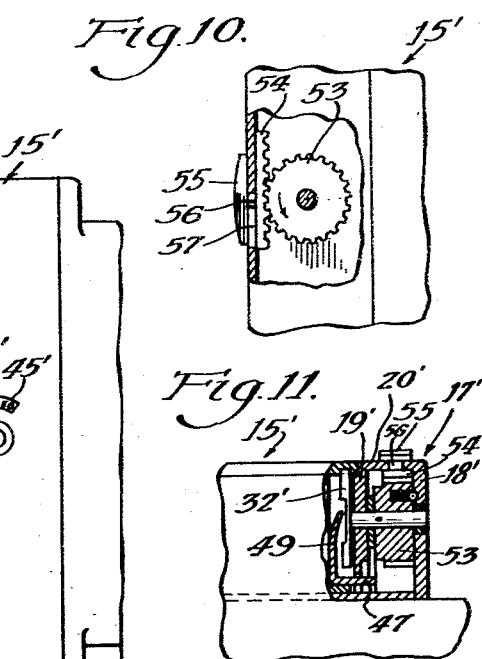

Patented Apr. 1, 1947

2,418,331

UNITED STATES PATENT OFFICE 2,418,331

MAGAZINE HOLDER FOR MOTION-PICTURE CAMERAS

Theodore S. Briskin and Joseph Golick, Chicago, Ill., assignors to Revere Camera Company, Chicago, Ill., a corporation of Delaware Application February 15, 1945, Serial No. 577,970

9 Claims. (Cl. 88—17)

1

This invention relates to improvements in magazine holders for motion picture cameras.

In certain types of motion picture cameras, the film is supplied in a light-proof container or magazine which may be inserted into a magazine chamber in the camera.

The magazine includes a shutter which is automatically opened after the parts are in the proper position whereby pictures may be taken. With a device of this sort, the motion picture film can be changed in broad daylight.

In some devices of this kind, a magazine holder is provided for holding the magazine and for bringing it into operative position with respect to the lens of the camera. In that form of this invention which is disclosed herein, the magazine holder is in the form of a drawer or sliding tray which can slide in and out of the magazine chamber. However, this invention is applicable to other types of magazine holders. Magazine cameras of this type are usually provided with a lock so that the magazine holder can be locked in place, thereby preventing inadvertent opening of the camera and damage to the film.

Furthermore, the magazine must occupy a predetermined position with respect to the other parts in order to secure the proper focal distance. Frequently a spring biased member is employed which urges the magazine into operative position. Such a magazine positioning means makes it difficult to remove the magazine from the magazine holder, and therefore a magazine ejecting device is frequently employed. Heretofore, the locking means and the ejecting device have been separate mechanisms which have been separately controlled.

It is an object of this invention to provide a common control means for both the locking and ejecting means in a magazine holder.

A further object of this invention is to provide an improved locking means which indicates to the operator whether the lock is in latched or unlatched position.

The controls heretofore used have frequently projected from the body of the camera to an extent which interferes with the operation of the camera. Cameras of this type are commonly provided with view finding means which require that the camera be held up to the eye of the operator. Projecting controls interfere with the proper positioning of the camera with respect to the operator's eye, thereby making this operation difficult.

It is another object of this invention to provide an improved locking and ejecting means which are self contained within the camera, and in which the control means project from the surface of the camera only a very slight extent.

Still another object is to provide control means of the type described which tend to remain in either the latched or unlatched position, thereby insuring against inadvertent operation of the same.

Other objects, features and advantages will become apparent as this description proceeds.

With reference now to the drawings, in which like reference numerals designate like parts—

Fig. 1 is an elevation of a camera embodying a preferred embodiment of this invention;

Fig. 2 is an end view thereof;

Fig. 3 is an elevation of a magazine holder after it has been removed from the camera, a portion thereof being broken away;

Fig. 4 is a section taken along line 4—4 of Fig. 3;

Fig. 5 is a section taken along line 5—5 of Fig. 4;

Fig. 6 is a partial section taken along line 6—6 of Fig. 5;

Fig. 7 is a partial section taken along line 7—7 of Fig. 5;

Fig. 8 is an elevation of a modified form of this invention;

Fig. 9 is an end view of Fig. 8;

Fig. 10 is a view similar to Fig. 9, but with a portion of the cover broken away to show the underlying parts; and Fig. 11 is a section taken along line 11—11 of Fig. 8.

The reference numeral 12 designates generally a camera provided with the usual lens 27. The camera includes a casing 13 which encloses a magazine chamber 14, as shown in Fig. 5. A magazine holder 15 fits partially within the magazine chamber and is in the form of a tray 16 which also includes an exposed portion 17 which forms a continuation of the casing 13. The exposed portion 17 forms the top wall 20 of an enclosure which also includes transverse walls 18 and 19, and end walls 21 and 22. This exposed portion forms a unit which fits over one end of the tray 16.

The top wall 20 is provided with finger depressions 23 by means of which the operator can grasp the magazine holder and slide it outwardly of the camera. A magazine 24 is adapted to be received within the magazine holder 15, as shown in Fig. 3. A resilient arm 25 assists in holding the magazine within the holder, and in centering the film spool with respect to the other parts of the camera.

From the arrangement shown in Figs. 3 and 5, it will be seen that one edge of the magazine is slid under the resilient arm 25, after the magazine holder has been withdrawn from the magazine chamber. The outer edge of the magazine is then pressed downwardly until the magazine is wholly received within the confines of the magazine holder. The magazine holder may then be slid into the magazine chamber and locked in position.

In addition to the locking means, there is provided means to eject the magazine 24 from the magazine holder. In other words, the magazine is elevated to a sufficient extent, as indicated by the broken lines in Fig. 5, so that it may be grasped by the operator and removed from the holder.

A shaft 30 is journaled in the transverse walls 18 and 19, a suitable bushing 31 being provided in the wall 18. A cross head 32 is secured to the inner end of the shaft 30, the tip of one arm of which cooperates with a recess 33 formed in the under side of the top wall of the casing 13. Thus, the magazine holder may be locked in operative position.

A knurled thumb wheel 34 is secured to shaft 30 to provide a means by which the cross head and shaft may be rotated into latched position or into unlatched position. The thumb wheel extends through a suitable slot in the top wall 20 so that it may be engaged by the thumb of the operator. Pivotally mounted on shaft 30 is an arm 35 which is disposed substantially parallel to the transverse wall 19. The latter wall is slotted so as to permit a projection 36 to extend through the wall into the tray portion of the magazine holder. The projection is adapted to lie flush with the bottom surface of the tray at a point directly beneath the magazine 24. When this arm is lifted, it serves to eject the magazine.

The hub portion of the arm 35 is provided with a shoulder 37 which is engaged by a pin 38 projecting from the wheel 34. By this arrangement, as shown in Fig. 4, after the wheel has been rotated into the unlatched position, further rotation thereof will cause the pin 38 to engage the shoulder 37, thereby rotating the arm 35 and ejecting the magazine.

A series of depressions 39, 40 and 41 are provided in the transverse wall 18. These holes correspond to the latched position, the unlatched position, and the ejecting position, respectively. The wheel 34 is mounted closely adjacent the transverse wall 18 and is provided with a bore 42. A ball 43 and a spring 44 are disposed within bore 42, as shown in Fig. 5, the depressions 39, 40 and 41 being in registry with the path of the ball 43. The cooperation of the ball 43 with one or the other of the series of depressions tends to cause the wheel 34 to remain in one of said three positions. Thus inadvertent rotation of the wheel, and consequent unlatching of the magazine holder, is prevented. Such inadvertent opening might otherwise be caused by the friction of the operator's hand as it is passed over the thumb wheel 34.

A window 45 is provided in the wall 18 which exposes a portion of the wheel 34. Suitable indicia 46 are provided on the wheel to indicate whether it is in latched or unlatched position.

The magazine is urged forwardly in the holder by means of an arm 47 which is pivoted on a screw 48 taking into the base of the tray 16. The arm 47 terminates in a magazine engaging shoe 49. A suitable spring 50 is provided which biases the arm and shoe against the edge of the magazine.

A modified form of this invention is shown in Figs. 8 to 11, in which the corresponding parts are designated by the same reference numerals as employed in Figs. 1 to 7, inclusive, with the exception that the reference numerals are primed.

In this modified form of the invention a gear wheel 53 is substituted for the knurled thumb wheel 34. The gear 53 is rotated by a cooperating rack 54. The rack is suitably mounted in the top wall 20' and is maintained in position for sliding movement by virtue of the configuration of its associated parts. The associated parts include a thumb button 55, and a pin 56, the ends of the pin being secured to the thumb button and the rack. The pin extends through a slot 57 in the top wall 20', and the thumb button and rack are disposed adjacent the opposite surfaces of the top wall 20'.

It will be seen from Figs. 10 and 11 that when the operator slides the thumb button, the gear 53 will be rotated, thereby rotating the cross head 32' and causing actuation of the ejecting means in the same manner as described with respect to Figs. 1 to 7, inclusive.

With reference now to Figs. 1 to 7, it will be seen that the magazine holder 15 is unlocked by rotating the knurled thumb wheel 34. The magazine holder may then be removed and the magazine 24 inserted. If the arm 35 and projection 36 are in the elevated position, thumb pressure on the magazine will be sufficient to cause them to be returned to the full line position of Fig. 4, wherein the projection is flush with the bottom of the tray 16. The magazine holder is then pushed into the magazine chamber and the thumb wheel rotated into the latched position, which position is indicated by the word "Closed" which is exposed through a window 45.

The thumb wheel is rotated in the opposite direction to unlatch the magazine holder; it is then withdrawn from the camera, and the thumb wheel is then rotated further to operate the ejecting means.

The modification of Figs. 8 to 11, inclusive, operates in the same manner, with the exception that the manual control element, the thumb button 55, slides instead of rotates.

It will be seen that the only projecting part is the thumb wheel or thumb button. This facilitates the use of the camera inasmuch as it permits the camera to be held close to the operator's eye. Furthermore, the indicia "Open" or "Closed," permit the operator at all times to determine readily whether the camera is in condition for taking pictures.

Although only preferred embodiments of this invention have been disclosed herein, it is ob-

We claim:

1. A magazine holder having a magazine supporting wall and a latch for locking the magazine holder in operative position with respect to a camera, comprising a rotatable member for actuating said latch, magazine ejecting means provided with a portion disposed along said magazine supporting wall and underlying a magazine disposed therein, and lost motion means carried by said rotatable member for engaging said ejecting means to operate the same when said rotatable member is rotated into unlatched position.

2. A magazine holder having a magazine supporting wall and a latch for locking the magazine holder in operative position with respect to a camera, comprising a rotatable member for actuating said latch, magazine ejecting means provided with a portion disposed along said magazine supporting wall and underlying a magazine disposed therein, lost motion means carried by said rotatable member for engaging said ejecting means to operate the same when said rotatable member is rotated into unlatched position, a gear mounted on said rotatable member, and a manually operated rack meshing with said gear.

3. In a mechanism of the type described, the combination of a casing providing a magazine chamber, a magazine holder movable into and out of said chamber for moving a magazine disposed in said magazine holder into and out of operative position, a portion of said magazine holder being exposed, a rotatable means mounted in said magazine holder beneath said exposed portion and carrying a projection for engagement with a portion of said casing whereby said magazine holder may be locked in operative position, a magazine ejector arm pivotally mounted on said rotatable member, and means secured to said rotatable member and rotating therewith for engaging a portion of said ejector arm after said rotatable member has been rotated into a position wherein said projection is disengaged from said casing whereby further rotation of said rotatable member will cause rotation of said ejecting arm.

4. In a mechanism of the type described, the combination of a casing providing a magazine chamber, a magazine holder movable into and out of said chamber for moving a magazine disposed in said magazine holder into and out of operative position, a portion of said magazine holder being exposed, a rotatable means mounted in said magazine holder beneath said exposed portion and carrying a projection for engagement with a portion of said casing whereby said magazine holder may be locked in operative position, a magazine ejector arm pivotally mounted on said rotatable member, means secured to said rotatable member and rotating therewith for engaging a portion of said ejector arm after said rotatable member has been rotated into a position wherein said projection is disengaged from said casing, whereby further rotation of said rotatable member will cause rotation of said ejecting arm, and means associated with said rotatable member which tend to hold it in predetermined angular positions corresponding to the locked and unlocked positions thereof.

5. In a mechanism of the type described, the combination of a casing providing a magazine chamber, a magazine holder movable into and out of said chamber for moving a magazine disposed in said magazine holder into and out of operative position, a portion of said magazine holder being exposed, a shaft mounted in said magazine holder beneath said exposed portion, a cross head mounted at one end of said shaft for engagement with a correspondingly positioned recess in said casing whereby said magazine holder may be locked in operative position, a magazine ejector arm pivotally mounted on said shaft and having a portion extending along the bottom of said holder to underlie a magazine disposed therein, and means secured to said shaft and rotating therewith for engaging a portion of said ejector arm after said shaft has been rotated from locked into unlocked position.

6. In a magazine camera which includes a magazine holder provided with locking means and magazine ejecting means, common control means therefor including a rotatable element having a surface disposed adjacent the wall of said magazine holder, a bore in the surface of said rotatable member, a spring and a detent disposed within said bore, a series of depressions formed in said wall of said magazine holder in positions corresponding to different angular positions of said rotatable member, whereby said rotatable member may be caused to remain in either locked or unlocked position, and a lost motion connection between said control means and said ejecting means.

7. In a magazine camera which includes a magazine holder provided with locking means and magazine ejecting means, common control means therefor including a rotatable element having a surface disposed adjacent the wall of said magazine holder, detent means carried on said rotatable member and cooperating with said wall to maintain said rotatable member in either locked or unlocked position, indicia carried on said surface of said rotatable member, an opening in said wall to expose said indicia to the view of the operator, and a lost motion connection between said control means and said ejecting means.

8. In a magazine camera, a magazine holder in the form of a tray which is slidable in and out of a recess in said camera, said magazine holder including an exposed portion having spaced walls, a shaft journalled in said walls, a latch mounted on said shaft for engagement with a portion of said camera to lock said magazine holder in operative position, and a pivoted member mounted on said shaft having a portion extending along the bottom of said tray to underlie a magazine disposed therein, said pivoted member having a lost motion connection with said shaft to permit free rotation of said shaft and latching member of a limited extent with respect to said pivoted member, and a wheel secured to said shaft for manual rotation to control the position of said latching member and to operate said pivoted member to eject a magazine from said holder.

9. In a magazine camera, a magazine holder in the form of a tray which is slidable in and out of a recess in said camera, said magazine holder including an exposed portion having parallel transverse walls and a top wall, a shaft journalled in said walls, a latch mounted on said shaft for engagement with a portion of said camera to lock said magazine holder in operative position, and a pivoted ejecting member mounted on said shaft having a portion extending along the bottom of said tray to underlie a magazine disposed therein, said pivoted ejecting member having a lost motion connection with said shaft, a gear mounted on said shaft, and a rack slidably mounted on said top wall and engaging said gear.

THEODORE S. BRISKIN.
JOSEPH GOLICK.

REFERENCES CITED

The following references are of record in the file of this patent:

UNITED STATES PATENTS

| Number | Name | Date |
|---|---|---|
| 2,282,044 | Fairbanks | May 5, 1942 |
| 2,056,846 | Foster et al. | Oct. 6, 1936 |
| 1,641,405 | Wittel | Sept. 6, 1927 |
| 1,905,886 | Berkowitz | Apr. 25, 1933 |
| 2,183,529 | Fairbanks | Dec. 19, 1939 |
| 2,282,051 | Helbing et al. | May 5, 1942 |
| 2,347,519 | Sperry | Apr. 25, 1944 |

FOREIGN PATENTS

| Number | Country | Date |
|---|---|---|
| 488,171 | British | July 1, 1938 |